United States Patent Office 3,261,854
Patented July 19, 1966

3,261,854
3-DIMETHYLMERCAPTOLE STEROIDS AND PROCESS THEREFOR
Donald E. Ayer, Kalamazoo, Mich., assignor to The Upjohn Company, Kalamazoo, Mich., a corporation of Delaware
No Drawing. Filed Nov. 13, 1962, Ser. No. 237,281
20 Claims. (Cl. 260—397.4)

This invention relates to certain novel thio-steroids and is more particularly concerned with 17α-hydroxy-1β-methylthio-4-pregnene-3,20-dione, 3-dimethylmercaptole, 17α-hydroxy-1,4-pregnadiene-3,20-dione, 3-dimethylmercaptole and their 21-hydroxy counterparts; and in addition the aforesaid steroidal compounds having 11β-hydroxy, 11-keto, 9α-fluoro and 6α-methyl functions substituted individually or in combination and corresponding otherwise thereto, and the 17- and 21-monoesters of all of the foregoing compounds.

The novel compounds and process of this invention are illustratively represented by the following sequence of formulae:

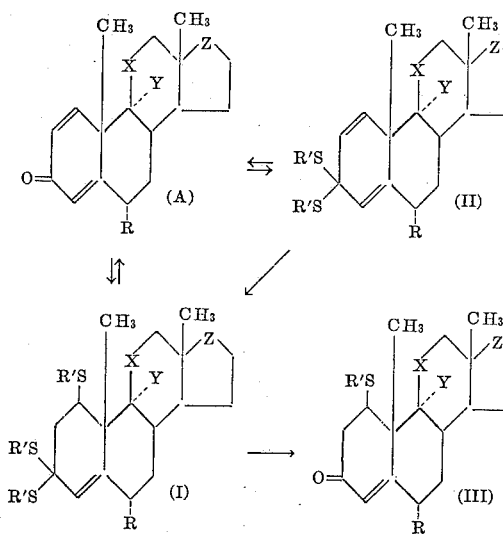

wherein R is selected from the group consisting of hydrogen and methyl; R' is a lower-alkyl radical, preferably one containing from one to eight carbon atoms, inclusive; Y is selected from the group consisting of hydrogen and fluorine; when Y is hydroxen, X is selected from the group consisting of the methylene radical ($>CH_2$), the β-hydroxymethylene radical

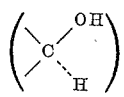

and the carbonyl radical ($>C=O$); when Y is fluorine, X is selected from the group consisting of the β-hydroxymethylene radical

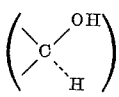

and the carbonyl radical ($>C=O$); X and Y together is a double bond at the 9(11)-position; Z is selected from the group consisting of

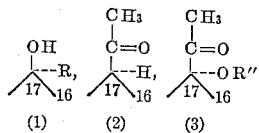

and

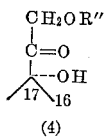

wherein R has the same meanings as above and R'' is selected from the group consisting of hydrogen and the acyl radical of an organic carboxylic acid, preferably a hydrocarbon carboxylic acid.

When Z is limited to the values set forth for partial formulae (2) and (3), above, the starting materials (A) above, can be replaced by the corresponding 21-iodides (B) to produce 21-desoxy compounds of Formulae I and II in accordance with the following reaction scheme:

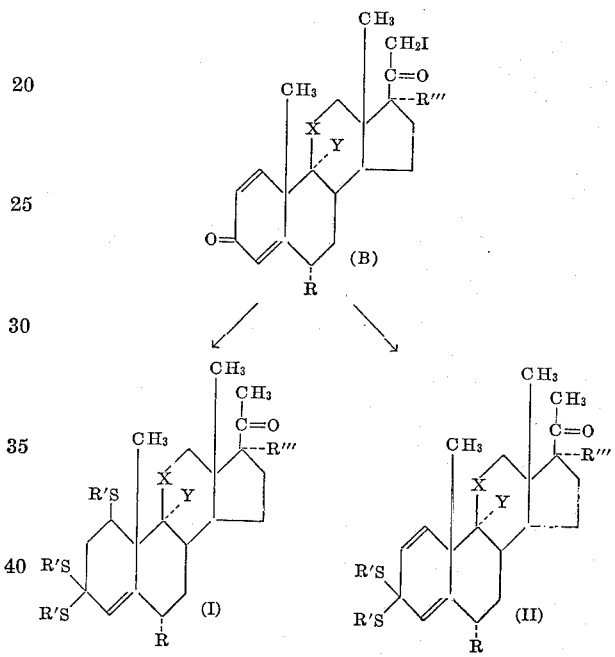

wherein R, R', X and Y have the same meanings as above and R''' is selected from the group consisting of hydrogen, hydroxy and the acyloxy radical of an organic carboxylic acid, preferably a hydrocarbon carboxylic acid, containing from one to twelve carbon atoms, inclusive.

The starting materials employed in the process of this invention can be selected from those represented by either Formula A or B of the above flow-sheets. The use of starting steroids represented by Formula A for preparing compounds of Formulae I and II requires the addition of a suitable acid catalyst (see Table 1 following Example 1A), e.g., hydrogen halides, such as hydrogen iodide, hydrogen bromide and the like; sulfonic acids such as p-toluene sulfonic acid, 2,4-dinitrobenzene sulfonic acid, methane sulfonic acid and the like; Lewis acids such as boron trifluoride, boron trichloride and the like. When a 21-iodo compound (B) is utilized, no catalyst need be added to the reaction mixture in order to obtain the compounds of Formulae I and II, since anhydrous hydrogen iodide is generated by the reaction of a 21-iodo-20-oxosteroid with methanethiol.

The course of the reaction in this invention is remarkably dependent on the solvent employed. Reaction of a starting material of Formula A with an appropriate catalyst and an alkanethiol (e.g., methanethiol) employing a dialkylformamide (e.g., dimethylformamide) as solvent, yields the corresponding 3-dialkylmercaptole (II). Following the same procedure but substituting tetrahydrofuran or t-butyl alcohol as solvent, results additionally in the formation of 1β-alkylthio-3-dialkylmercaptoles (I). The starting compounds represented by Formula B can be substituted in the foregoing procedures to obtain the products of Formulae I and II; they do not require an added catalyst.

The 3-dialkylmercaptoles (II) of this invention can be advantageously prepared by utilizing the general procedures that follow. A solution of a $\Delta^{1,4}$-3-oxosteroid (A) in a dialkylformamide is cooled to about 0° C., and iodine and an alkanethiol added; the latter two substances react immediately to form hydrogen iodide. The reaction mixture is allowed to stand about 3 to 5 days at a temperature of about 25° C. The alkylene thioketal (II) formation in a dialkylformamide is relatively slow at room temperature and requires from about three to about five days for completion of the reaction. At elevated temperatures (e.g., at about 60° C.) the reaction time can be decreased. However, at such elevated temperatures and employing, for example, low-boiling methanethiol, it is necessary to use a sealed reaction system to retain the aforesaid reagent. In general, a convenient temperature range for the reaction is between about 0° to 30° C. After the reaction has gone to completion, the reaction mixture is diluted with ice water, the product collected by filtration and purified by recrystallization from commonly used solvents or mixtures of solvents, e.g., acetone, ethanol, ether, methylene chloride-Skelleysolve B (hexanes) and acetone-Skelleysolve B.

The amount of iodine used in the above disclosed process of preparing the 3-dialkylmercaptoles (II), is in the range of 0.1 to 5 moles per mole of steroid; conveniently, about 1 mole per mole is employed. In the special case wherein the starting $\Delta^{1,4}$-3-oxosteroid also contains an α-iodoketone (B), no iodine need be added to the reaction mixture since the iodide is reduced by the alkanethiol with concomitant production of hydrogen iodide. The alkanethiol is used in excess of the theoretical amount, 15 to 100 moles per mole of steroid can be advantageously utilized.

The 1β-alkylthio-3-dialkylmercaptoles (I) of this invention can be readily and conveniently prepared in accordance with the methods that follow. A solution of a $\Delta^{1,4}$-3-oxosteroid (A) in tetrahydrofuran is cooled to about 0° C., excess alkanethiol (15 to 100 moles per mole of steroid) is added followed by the addition of iodine. A rapid reaction occurs following the addition of iodine; conjugated ketone absorption in the infrared spectrum is absent after a reaction time of about 10 to 30 minutes at 25° C. The mixture is stirred at about 25° C. until the iodine color is discharged (0.5 to 1 hour), poured into water and the solid product isolated in a conventional manner. Alternatively, pyridine is added and the reaction mixture evaporated to dryness under reduced pressure, the residue dissolved (e.g., in methylene chloride), washed with cold water, dried and re-evaporated to give the crude product which is then recrystallized by methods well known in the art. A catalytic amount of iodine is used, i.e., from about 0.1 to 1 mole per mole of starting steroid (A). The quantity of pyridine added is the amount sufficient to neutralize the hydrogen iodide produced by the reaction of iodine and the alkanethiol. In the special case wherein the starting steroidal material is a compound represented by Formula B, no iodine need be added to the reaction mixture.

The above process for preparing the compounds of Formula I can be carried out by replacing iodine with p-toluenesulfonic acid and extending the reaction time to from about 16 to about 72 hours at 25° C. In certain cases t-butyl alcohol can be advantageously employed as solvent. A suspension of a compound of Formula A in t-butyl alcohol is stirred with an excess of an alkanethiol and 0.1 to 1 mole of iodine per mole of steroid at 26° C. until the solids dissolve. After a period of about 16 to about 24 hours the product (I) separates as a crystalline solid which is filtered, washed with cold solvent (e.g., acetone) and dried.

The $\Delta^{1,4}$-3-oxo system (A) can be regenerated in high yield by treating the 1β-alkylthio-3-dialkylmercaptoles (I) and the 3-dialkylmercaptoles (II) with a mixture of an α-keto acid (e.g., pyruvic acid) in an aqueous weak acid (e.g., acetic acid). When hydrolysis with aqueous acetone-sulfuric acid is employed the 1β-alkylthio-3-dialkylmercaptoles (I) are converted to the corresponding 1β-alkylthio-$\Delta^4$-3-oxosteroids (III). Also, the reaction of the compounds of Formula II in tetrahydrofuran with an alkanethiol in the presence of a catalyst (e.g. iodine), yields the compounds of Formula I.

Thiols such as methanethiol, ethanethiol, butanethiol, ethanedithiol, α-toluenethiol and the like can be readily employed in the process of this invention. The methylthio compounds (I, II and III) are easily isolated in crystalline form.

The $\Delta^{1,4}$-3-ketosteroids (A) (B) starting materials can be prepared by the 1-dehydrogenation of the corresponding $\Delta^4$-3-ketosteroids by known methods, for example, by reaction with selenium dioxide or dicyanodichlorobenzoquinone, or microbial fermentation (e.g., with fungi of the genus Septomyxa).

Certain of the novel compounds of this invention, namely, those of Formulae I and II of the flow-sheet in column 1, wherein Z has the value indicated by (1), R is selected from the group consisting of hydrogen and methyl and X and Y are hydrogen, have a high degree of anabolic activity accompanied by a low order of androgenicity.

The novel compounds represented by Formulae I and II of the flow-sheet in column 1, wherein R, R', X and Y have the meanings set forth following the aforesaid flow-sheet and Z has the values indicated by (2), (3) and (4) therein, exhibit anti-inflammatory, salt and water eliminating, anti-bacterial, anti-fungal, progestational and fertility-regulating properties of improved therapeutic ratio. Their anti-inflammatory activity makes them useful in the treatment of various arthritic conditions and in the control of inflammatory conditions due to bacterial infections or allergic reactions of skin or mucous membranes. The anti-inflammatory activity of these compounds has been found to be unaccompanied by undesirable side effects, such as, excessive sodium retention and potassium excretion, negative nitrogen balance, increased gastric acidity and edema, which is frequently associated with steroidal compounds demonstrating a high degree of anti-inflammatory response. These novel compounds, while displaying a high degree of anti-inflammatory activity, produce a much lower order of glucocorticoid response. This highly desirable specificity permits long term treatment of anti-inflammatory conditions without the concomitant production of side-effects resulting from the glucocorticoid activity possessed by, for example, hydrocortisone. The aforesaid novel compounds do not retain salt and water in the tissues of the animal organism, thus making them especially valuable in the management of chronic congestive heart failure, in the treatment of the nephrotic syndrome, cirrhosis of the liver, eclampsia and pre-eclampsia. These compounds are effective in the treatment of diseases caused by certain bacteria and fungi. They are also advantageously employed either alone, or in combination with an androgen (e.g., 17-methyltestosterone, testosterone cyclopentylpropionate), or an estrogen (e.g., 17-ethinylestradiol 3-methyl ether, estradiol cyclopentylpropionate) in maintaining pregnancy and regulating fertility in valuble domestic animals. All of the compounds embraced by Formula I of the flow-sheet in column 1 are additionally useful as starting materials for the preparation of all of the compounds of Formula III, which are therapeutically valuable as anti-inflammatory agents. The compounds of Formulae I, II and III potentiate the emulsifying efficiency of fats.

The compounds comprised by Formula III of the flow-sheet in column 1, have anti-inflammatory activity of the pattern and of the efficacy afforded in the treatment of the diseases indicated for those of Formulae I and II in the immediately preceding paragraph.

The compounds of the present invention can be prepared and administered to mammals, birds and animals in a wide variety of oral and parenteral dosage forms, singly, or in admixture with other coacting compounds. They can be associated with a carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

EXAMPLE 1A.—11β,17α-DIHYDROXY-9α-FLUORO-1,4-PREGNADIENE-3,20-DIONE, 3-DIMETHYLMERCAPTOLE (II)

To a solution of 0.44 g. of 11β,17α-dihydroxy-9α-fluoro-1,4-pregnadiene-3,20-dione (A) [prepared in the manner disclosed in J. Am. Chem. Soc. 77, 4182 (1955)] in 30 ml. of dimethylformamide cooled to 0° C. were added 350 mg. (1.38 millimoles) of iodine and 4 ml. of methanethiol. The iodine color disappeared immediately. After standing for a period of about 3 days at about 25° C., the solution was diluted with 450 ml. of ice water to give, after filtration and drying, 0.45 g. of a white solid with a melting point of 175 to 180° C. The solid was stirred for about 15 mins. with 25 ml. of methylene chloride and filtered yielding 0.06 g. (13%) of insoluble starting steroid (A). The filtrate gave, after crystallization from a mixture of methylene chloride and Skellysolve B (hexanes), 0.19 g. (36% yield) of 11β,17α-dihydroxy-9α-fluoro-1,4-pregnadiene-3,20-dione, 3-dimethylmercaptole (II).

Following the procedure of Example 1A, but substituting for iodine other catalysts (e.g., p-toluenesulfonic acid, hydrogen bromide in acetic acid or boron trifluoride etherate), also yields 11β,17α-dihydroxy-9α-fluoro-1,4-pregnadiene-3,20-dione, 3-dimethylmercaptole (II).

The data set forth in Table 1 are typical of that obtained in a number of experiments carried out to determine the efficacy of various acid catalysts:

in 30 ml. of dimethylformamide was cooled in a flask kept in an ice bath and about 10 ml. of methanethiol added. The flask was stoppered and allowed to stand at about 25° C. for a period of about 4 days. The excess methanethiol was purged with a stream of nitrogen and on dilution with 250 ml. of ice water a gummy solid precipitated. The supernatant liquid was decanted and the gum dissolved in 50 ml. of acetone and the resulting solution diluted slowly with 200 ml. of water. After stirring for a period of about 2 hours at about 25° C., the gummy precipitate became crystalline and was filtered off to yield 1.69 g. of white powder. Its infrared spectrum showed almost complete absence of conjugated ketone absorption. Crystallization of the powder from a mixture of methylene chloride and Skellysolve B gave 0.92 g. (50% yield) of 11β,17α-dihydroxy-9α-fluoro-1,4-pregnadiene-3,20-dione, 3-dimethylmercaptole (II) as white, glistening crystals that melted at 182 to 184° C. with the evolution of gas.

*Analysis.*—Calcd. for $C_{23}H_{33}O_3S_2F$: C, 62.69; H, 7.55; S, 14.55; F, 4.31. Found: C, 62.33; H, 7.78; S, 14.52; F, 4.64.

Ultraviolet spectrum: end absorption; 244 mμ (shoulder); λ max. 292 (ε=88).

Infrared spectrum:

$\gamma_{max.}^{Nujol}$ 3550, 1693, 1133, 1125, 1080, 1040 cm.$^{-1}$

Following the procedure of Example 1B but substituting 11β,17α-dihydroxy-9α-fluoro-6α-methyl-21-iodo-1,4-pregnadiene-3,20-dione (B) (prepared in the manner disclosed in Example 2 of U.S. Patent 2,867,637) as starting material, yields 11β,17α-dihydroxy-9α-fluoro-6α-methyl-1,4-pregnadiene-3,20-dione, 3-dimethylmercaptole (II).

EXAMPLE 1C.—9α-FLUORO-11β,17α,21-TRIHYDROXY-1,4-PREGNADIENE-3,20-DIONE 21-ACETATE, 3-DIMETHYLMERCAPTOLE (II)

A solution of 0.84 g. of 9α-fluoro-11β,17α,21-trihydroxy-1,4-pregnadiene-3,20-dione 21-acetate (A) [prepared in the manner disclosed in J. Amer. Chem. Soc. 77, 4181 (1955)], in 30 ml. of dimethylformamide was cooled in an ice bath and 6 ml. of methanethiol and 0.55 g. of iodine added. The colorless solution was allowed to stand for a period of about 4 days at a temperature of

*Table 1*

| A (Initial) (millimoles) | Dimethylformamide (ml.) | Methanethiol (ml.) (a) | Catalyst (millimoles) (b) | Time (days) | Temp. (° C.) | A (Recovered) (percent) | Recrystallized II (percent) |
|---|---|---|---|---|---|---|---|
| 1.21 | 30 | 4 | Iodine [1] (1.38) | 3 | 25 | 13 | 36 |
| 1.21 | 30 | 4 | Iodine (1.38) | 1 | 60 | | 36 |
| 1.21 | 30 | 3 | Iodine (0.61) | 3 | 25 | 41 | 30 |
| 2.0 | 30 | 6 | HBr in HAc (2) | 4 | 25 | 17 | 37 |
| 2.07 | 50 | 10 | PTSA [2] (2) | 4 | 25 | 48 | 21 |
| 2.0 | 30 | 1.5 | PTSA [2] (2.1) | 4 | 25 | 60 | 18 |
| 2.0 | 30 | 6 | $(C_2H_5)_2O.BF_3$(2.3) | 4 | 25 | 69 | 13 |
| 1.38 | 35 | 3 | None | 3 | 25 | 86 | 0 |

[1] $CH_3SH(a)+I_2(b) \rightarrow HI+CH_3SI$.
[2] p-Toluenesulfonic acid.

The recovery of 11β,17α-dihydroxy-9α-fluoro-1,4-pregnadiene-3,20-dione (A) is considered of greater significance than the yield of 11β,17α-dihydroxy-9α-fluoro-1,4-pregnadiene-3,20-dione, 3-dimethylmercaptole (II).

EXAMPLE 1B.—11β,17α-DIHYDROXY-9α-FLUORO-1,4-PREGNADIENE-3,20-DIONE, 3-DIMETHYLMERCAPTOLE (II)

A solution of 2 g. of 11β,17α-dihydroxy-9α-fluoro-21-iodo-1,4-pregnadiene-3,20-dione (B) (prepared in the manner disclosed in Example 5 of U.S. Patent 2,814,632)

about 25° C. The solution was diluted to a volume of 250 ml. with ice water at which point a white solid separated. The solid was collected, dried in vacuo to give 0.94 g. (95% yield) of crude product melting at 160° C. with bubbling. Successive crystallizations from mixtures of methylene chloride and Skellysolve B and acetone and Skellysolve B gave 0.19 g. of pure 9α-fluoro-11β,17α,21-trihydroxy-1,4-pregnadiene-3,20-dione 21-acetate, 3-dimethylmercaptole (II) with a melting point of 163 to 167° C.

*Analysis.*—Calcd. for $C_{25}H_{35}FO_5S_2$: C, 60.21; H, 7.07; F, 3.81; S, 12.86. Found: C, 60.35; H, 6.98; F, 4.11; S, 13.41.

EXAMPLE 2A.—11β,17α-DIHYDROXY-9α-FLUORO-1β - METHYLTHIO-4-PREGNENE-3,20-DIONE, 3-DIMETHYLMERCAPTOLE (I)

A suspension of 0.725 g. (2 millimoles) of 11β,17α-dihydroxy-9α-fluoro-1,4-pregnadiene-3,20-dione (A) in 30 ml. of tetrahydrofuran was cooled in an ice bath, and 6 ml. of methanethiol and 0.40 g. of p-toluenesulfonic acid monohydrate added. The mixture was stirred for a period of about 3 days at 25° C. at which time a clear solution resulted. After standing at the same temperature an additional day, the solution was rapidly diluted with about 200 ml. of ice wtaer, resulting in the formation of a precipitate that was collected by filtration to give 0.89 g. of a crude product displaying only end absorption in its ultraviolet spectrum. Crystallization of the precipitate from a mixture of methylene chloride and Skellysolve B gave 0.49 g. of 11β,17α-dihydroxy-9α-fluoro-1β-methylthio-4-pregnane-3,20-dione, 3-dimethylmercaptole (I) with a melting point of 195 to 196° C.

EXAMPLE 2B.—11β,17α-DIHYDROXY-9α-FLUORO-1β - METHYLTHIO-4-PREGNENE-3,20-DIONE, 3-DIMETHYLMERCAPTOLE (I)

A solution of 0.976 g. (2 millimoles) of 11β,17α-dihydroxy - 9α - fluoro-21-iodo-1,4-pregnadiene-3,20-dione (B) in 30 ml. of tetrahydrofuran was cooled in an ice bath and 6 ml. of methanethio added. An iodine color developed in the solution and persisted for a period of about 30 minutes. This phenomenon was in contradistinction to the reaction of Example 1B employing dimethylformamide as solvent, wherein no color appeared. A small white precipitate formed in the reaction vessel that redissolved in several hours. After standing for about 4 days at a temperature of about 25° C., the solution was rapidly diluted with about 200 ml. of ice water and 0.91 g. of granular product collected by filtration. A sample of the produce showed only end absorption in its ultraviolet spectrum. Crystallization from a mixture of methylene chloride and Skellysolve B gave 0.63 g. of 11β,17α-dihydroxy-9α-fluoro-1β-methylthio-4-pregnene-3,20-dione, 3-dimethylmercaptole (I) with a melting point of 193 to 195° C.

The first crops of crystals from Examples 2A and 2B were combined (1.12 g.) and crystallized from a mixture of acetone and Skellysolve B to give 0.86 g. (44% yield) of white needles melting at 201 to 203° C. with evolution of gas. The analytical sample crystallized from a mixture of methylene chloride and Skellysolve B had a melting point of 196 to 198° C.

*Analysis.*—Calcd. for $C_{24}H_{37}FO_3S_3$: C, 58.98; H, 7.63; S, 19.68; F, 3.89. Found: C, 58.57; H, 7.44; S, 19.63; F, 3.62.

Ultraviolet spectrum: end absorption; 236 mμ (shoulder); λ max. 292 mμ (ε=93).

Infrared spectrum:

$\gamma_{max}^{Nujol}$ 3490, 3450, 1690, 1650, 1250, 1105, 1045, 1025 cm.$^{-1}$ Following the procedure of Example 2B but substituting 11β,17α - dihydroxy-9α-fluoro-6α-methyl-21-iodo-1,4-pregnadiene-3,20-dione (B) as starting compound, yields 11β,17α - dihydroxy - 9α-fluoro-6α-methyl-1β-methylthio-4-pregnene-3,20-dione 3-dimethylmercaptole (I).

EXAMPLE 2C.—9α - FLUORO - 1β - METHYLTHIO-11β,17α,21 - TRIHYDROXY - 4 - PREGNENE - 3,20-DIONE 21 - ACETATE, 3 - DIMETHYLMERCAPTOLE (I)

(1) A solution of 0.84 g. of 9α-fluoro-11β,17α,21-trihydroxy-1,4-pregnadiene-3,20-dione 21-acetate (A) in 30 ml. of tetrahydrofuran was cooled in an ice bath and 6 ml. of methanethiol and 0.55 g. of iodine added. The solution was allowed to stand for a period of about 4 days at about 25° C. On dilution with about 250 ml. of ice water, 1.06 g. of product separated as a white solid. Successive crystallizations from mixtures of methylene chloride-Skellysolve B and acetone-methylene chloride gave 0.41 g. of pure 9α-fluoro-1β-methylthio-11β,17α,21-trihydroxy-4-pregnene-3,20-dione 21-acetate, 3-dimethylmercaptole (I) with a melting point of 202 to 205° C.

*Analysis.*—Calcd. for $C_{26}H_{39}FO_5S_3$: C, 57.11; H, 7.11; F, 3.47; S, 17.59. Found: C, 57.16; H, 7.16; F, 3.64; S, 17.44.

When the experiment of Example 2C (1) was repeated in the same manner but the reaction mixture diluted with water after standing only 1 hour at 25° C., a comparable yield of 9α-fluoro-1β-methylthio-11β,17α,21-trihydroxy-4-pregnene-3,20-dione 21-acetate, 3-dimethylmercaptole (I) was obtained.

Repeating the experiment of Example 2C (1), but employing only 0.10 g. of iodine gave a comparable yield of the desired 9α - fluoro - 1β - methylthio-11β,17α,21-trihydroxy-4-pregnene-3,20-dione 21-acetate, 3-dimethylmercaptole (I).

When the experiment of Example 2C (1) was repeated but using instead of iodine, 0.40 g. of p-toluenesulfonic acid monohydrate and diluting the reaction mixture with water after standing only 22 hours at 25° C., there was obtained a 25% yield of 9α-fluoro-1β-methylthio-11β,17α, 21 - trihydroxy - 4 - pregnene-3,20-dione 21-acetate, 3-dimethylmercaptole (I).

When a solution of hydrogen iodide in tetrahydrofuran was prepared by the addition of 6 ml. of methanethiol to a solution of 0.55 g. of iodine in 30 ml. of tetrahydrofuran and 0.84 g. of 9α-fluoro-11β,17α,21-trihydroxy-1,4-pregnadiene-3,20-dione 21-acetate (A) added to the colorless solution essentially no reaction occurred during a 24 hour period at 25° C. After a period of about one week at this temperature the reaction mixture was diluted with ice water, the precipitated material separated and recrystallized successively from methylene chloride-Skellysolve B and acetone-methylene chloride to give 0.55 g. of a mixture of 9α-fluoro-1β-methylthio-11β,17α,21-trihydroxy-4-pregnene-3,20-dione 21-acetate, 3-dimethylmercaptole (I) and 9α-fluoro-11β,17α,21-trihydroxy-1,4-pregnadiene - 3,20 - dione 21-acetate, 3-dimethylmercaptole (II).

(2) To a stirred solution of 0.55 g. of iodine in 30 ml. of t-butyl alcohol at 26° C., 6 ml. of cold methanethiol at —20° C. was added. To the resulting colorless solution, 0.84 g. of 9α-fluoro-11β,17α,21-trihydroxy-1,4-pregnadiene-3,20-dione 21-acetate (A) was added and the mixture stirred for about 1 hour until the compound was completely dissolved. The solution was allowed to stand for a period of about 24 hours at about 26° C. during which time white crystals separated; they were filtered, washed with acetone and dried to yield 0.63 g. of 9α-fluoro - 1β-methylthio-11β,17α,21-trihydroxy-4-pregnene-3,20-dione 21-acetate, 3-dimethylmercaptole (I) with a melting point of 197 to 199° C.

Instead of using 0.55 g. of iodine, the same procedure was carried out with 0.11 g. of iodine and gave 0.54 g. of 9α-fluoro - 1β - methylthio-11β,17α,21-trihydroxy-4-pregnene - 3,20 - dione 21-acetate, 3-dimethylmercaptole (I) with a melting point of 198 to 200° C.

EXAMPLE 2D.—11β,17α - DIHYDROXY-9α-FLURO-6α - METHYL - 1β - METHYLTHIO - 4 - PREGNENE - 3,20 - DIONE 17 - ACETATE, 3 - DIMETHYLMERCAPTOLE (I)

A solution of 0.836 g. of 11β,17α-dihydroxy-9α-fluoro-6α - methyl - 1,4 - pregnadiene-3,20-dione 17-acetate (A) [prepared in the manner disclosed in J. Org. Chem. 25, 1675 (1960)], in 30 ml. of tetrahydrofuran was cooled in an ice bath and 6 ml. of methanethiol and 0.55 g. of iodine added. The mixture was allowed to warm to about 25° C. and allowed to stand at that temperature for a period of about 16 hours. After the addition of 0.5 ml. of pyridine, the solution was evaporated to dryness under reduced pressure, the residue dissolved in methylene chloride, washed with water and dried over magnesium sulfate. The methylene chloride extract was concentrated and crystallized twice from a mixture of methanol and methylene chloride containing one drop of pyridine to yield 0.83 g. of 11$\beta$,17$\alpha$-dihydroxy-9$\alpha$-fluoro-6$\alpha$ - methyl-1$\beta$-methylthio-4-pregnene-3,20-dione 17-acetate, 3-dimethylmercaptole (I) with a melting point of 207 to 209° C.

*Analysis.*—Calcd. for $C_{28}H_{45}FO_5S_3 \cdot CH_3OH$: C, 58.30; H, 7.86; S, 16.68. Found: C, 58.49, H, 8.03; S, 17.23.

EXAMPLE 2E.—9$\alpha$ - FLUORO - 6$\alpha$ - METHYL - 1$\beta$-METHYLTHIO - 11$\beta$,17$\alpha$,21 - TRIHYDROXY - 4 - PREGNENE - 3,20 - DIONE 21 - ACETATE, 3 - DIMETHYLMERCAPTOLE (I)

A solution of 1.74 g. of 9$\alpha$-fluoro-6$\alpha$-methyl-11$\beta$,17$\alpha$,21-trihydroxy-1,4-pregnadiene-3,20-dione 21-acetate (A) (prepared in the manner disclosed in Example 15 of U.S. Patent 2,928,851) in 40 ml. of tetrahydrofuran was cooled in an ice bath and 10 ml. of methanethiol and 1 g. of iodine added. After a period of about 0.75 hour, 1 ml. of pyridine was added and the solution evaporated to dryness under reduced pressure. The residue was dissolved in methylene chloride, washed twice with water, dried over magnesium sulfate and the methylene chloride extract evaporated to give a partly crystalline residue. The residue was recrystallized successively from mixtures of acetone-Skellysolve B and methanol-methylene chloride containing 1 drop of pyridine to yield 0.94 g. of 9$\alpha$-fluoro - 6$\alpha$-methyl-1$\beta$-methylthio-11$\beta$,17$\alpha$,21-trihydroxy-4-pregnene-3,20-dione 21-acetate, 3-dimethylmercaptole (I) with a melting point of 189 to 192° C.

*Analysis.*—Calcd. for $C_{27}H_{41}FO_5S_3$: C, 57.82; H, 7.37; F, 3.39; S, 17.15. Found: C, 57.75; H, 7.17; F, 3,61; S, 17.77.

EXAMPLE 2F.—11$\beta$,17$\alpha$,21-TRIHYDROXY-1$\beta$-METHYLTHIO-4-PREGNENE-3,20-DIONE 21-ACETATE, 3-DIMETHYLMERCAPTOLE (I)

Six ml. of methanethiol and 0.55 g. of iodine was added to a solution of 0.8 g. of 11$\beta$,17$\alpha$,21-trihydroxy-1,4-pregnadiene-3,20-dione 21-acetate (A) [prepared in the manner disclosed in Science 121, 176 (1955)], in 30 ml. of tetrahydrofuran. After a period of about 1 hour a colorless solution resulted, at which time 0.5 ml. of pyridine was added and the solution evaporated to dryness under reduced pressure. The residue was dissolved in methylene chloride, washed twice with water, dried over magnesium sulfate and the methylene chloride extract evaporated to give a partly crystalline residue. Recrystallization from a mixture of acetone and Skellysolve B gave 30 mg. of 11$\beta$,17$\alpha$,21-trihydroxy-1$\beta$-methylthio-4-pregnene-3,20-dione 21-acetate, 3-dimethylmercaptole (I) with a melting point of 189 to 194° C.

Analysis.—Calcd. for $C_{26}H_{40}O_5S_3$: S, 18.19. Found: S, 18.69.

EXAMPLE 3.—11$\beta$,17$\alpha$ - DIHYDROXY - 9$\alpha$-FLUORO-1$\beta$ - METHYLTHIO - 4-PREGNENE-3,20-DIONE, 3-DIMETHYLMERCAPTOLE (I)

(*a*) A solution of 0.22 g. of 11$\beta$,17$\alpha$-dihydroxy-9$\alpha$-fluoro - 1,4-pregnadiene-3,20-dione, 3-dimethylmercaptole (II) (from Example 1A) in 8 ml. of tetrahydrofuran was cooled in an ice bath and 2 ml. of methanethiol and 0.13 g. of iodine added. After standing for a period of about 4 days at a temperature of about 25° C., the reaction mixture was diluted to a volume of about 125 ml. with cold water giving a white precipitate. This material was separated by filtration and the damp filter cake dissolved in methylene chloride, the solution dried over magnesium sulfate and evaporated to give 0.246 g. (100%) of a white foam. The foam was identified as 11$\beta$,17$\alpha$-dihydroxy-9$\alpha$- fluoro - 1$\beta$-methylthio-4-pregnene-3,20-dione, 3-dimethylmercaptole (I) by comparison of its infrared spectrum with that of an authentic sample prepared by the procedure of Example 2A, above. Crystallization from a mixture of methylene chloride and Skellysolve B gave 0.165 g. of 11$\beta$,17$\alpha$-dihydroxy-9$\alpha$-fluoro-1$\beta$-methylthio-4-pregnene-3,20-dione, 3-dimethylmercaptole (I) melting at 197 to 199° C.

(*b*) Following the procedure of Example 4(*a*) but reducing the reaction time to 1 hour, gave a comparable yield of 11$\beta$,17$\alpha$ - dihydroxy - 9$\alpha$ - fluoro-1$\beta$-methylthio-4-pregnene-3,20-dione, 3-dimethylmercaptole (I).

(*c*) When a solution of hydrogen iodide in tetrahydrofuran was prepared by the addition of 3 ml. of methanethiol to 0.27 g. of iodine in 15 ml. of tetrahydrofuran and 0.44 g. of 11$\beta$,17$\alpha$-dihydroxy-9$\alpha$-fluoro-1,4-pregnadiene-3,20-dione, 3-dimethylmercaptole (II) added to the colorless solution and allowed to stand about 1 hour at 25° C., a good yield of 11$\beta$,17$\alpha$-dihydroxy-9$\alpha$-fluoro-1$\beta$-methylthio-4-pregnene-3,20-dione, 3-dimethylmercaptole (I) was obtained.

Following the procedure of Example 4(*a*) but substituting as starting material 11$\beta$,17$\alpha$-dihydroxy-9$\alpha$-fluoro-6$\alpha$-methyl-1,4-pregnadiene-3,20-dione, 3-dimethylmercaptole (II), yields 11$\beta$,17$\alpha$-dihydroxy-9$\alpha$-fluoro-6$\alpha$-methyl-1$\beta$-methylthio-4-pregnene-3,20-dione, 3-dimethylmercaptole (I).

EXAMPLE 4.—11$\beta$,17$\alpha$-DIHYDROXY-9$\alpha$-FLUORO-1$\beta$-METHYLTHIO-4-PREGNENE-3,20-DIONE (III)

A solution of 0.49 g. of 11$\beta$,17$\alpha$-dihydroxy-9$\alpha$-fluoro-1$\beta$-methylthio-4-pregnene-3,20-dione, 3-dimethylmercaptole (I) (from Example 2A) in a mixture of 10 ml. of methylene chloride, 50 ml. of acetone and 3 ml. of 5% aqueous sulfuric acid was allowed to stand for a period of about 7 days at a temperature of about 25° C. Fifty ml. of ice water and 12 ml. of 4% sodium bicarbonate was added to the solution; the resulting mixture was concentrated at reduced pressure and then extracted with methylene chloride to yield 0.4 g. of a partially crystalline solid. Trituration with acetone left 0.257 g. of a yellow solid which was dissolved in a mixture of 95% methylene chloride and 5% acetone and chromatographed on a column of 50 g. of Florisil (synthetic magnesium silicate), yielding 0.208 g. of a white amorphous foam. Successive crystallizations from mixtures of methanol and water and acetone and Skellysolve B gave 85 mg. of 11$\beta$,17$\alpha$-dihydroxy - 9$\alpha$ - fluoro - 1$\beta$-methylthio-4-pregnene-3,20-dione (III) with an ultra violet absorption having $\lambda$ max. at 238 m$\mu$ ($\epsilon$=14,400).

*Analysis.*—Calcd. for $C_{22}H_{31}FO_4S$ (III)+10% 11$\beta$,17$\alpha$ - dihydroxy-9$\alpha$-fluoro-1$\beta$-methylthio-4-pregnene-3,20-dione, 3-dimethylmercaptole (I): C, 63,82; H, 7.61; S, 9.00. Found: C, 64.19; H, 7.39; S, 9.22.

EXAMPLE 5.—11$\beta$,17$\alpha$ - DIHYDROXY-9$\alpha$-FLUORO-1,4-PREGNADIENE-3,20-DIONE (A)

(*a*) To a suspension of 200 mg. of 11$\beta$,17$\alpha$-dihydroxy-1,4-pregnadiene-3,20-dione, 3-dimethylmercaptole (II) (from Example 1A) and 150 mg. of sodium acetate in 25 ml. of acetic acid, 2 ml. of pyruvic acid dissolved in 4 ml. of water was added. The mixture was heated under an atmosphere of nitrogen at about 80° C. with stirring for a period of about 2.5 hours. Dilution of the clear solution with ice and water produced a precipitate, which on filtration gave 160 mg. (97% yield) of a white solid identified by its infrared absorption spectrum and melting point as 11$\beta$,17$\alpha$-dihydroxy-9$\alpha$-fluoro-1,4-pregnadiene-3,20-dione (A).

(*b*) A 244 mg. sample of 11$\beta$,17$\alpha$-dihydroxy-9$\alpha$-fluoro-1$\beta$-methylthio-4-pregnene-3,20-dione, 3-dimethylmercaptole (I) (from Example 2B) was heated with pyruvic acid in aqueous acetic acid in the manner disclosed in (*a*), above. On dilution of the solution with ice and water to a volume of about 200 ml., 0.13 g. of a pale yellow solid (A) melting at 279 to 285° C. was obtained. The melting point was undepressed when admixed with an authentic sample of 11β,17α-dihydroxy-9a-fluoro-1,4-pregnadiene-3,20-dione (A).

Following the procedure of Example 6(a) but substituting 11β,17α-dihydroxy - 9α - fluoro-6α-methyl-1,4-pregnadiene-3,20-dione, 3-dimethylmercaptole (II) as starting material, yields 11β,17α-dihydroxy-9α-fluoro-6α-methyl-1,4-pregnadiene-3,20-dione (A).

Following the procedure of Example 6(b) but substituting 11β,17α-dihydroxy-9α-fluoro-6α-methyl-1β-methylthio-4-pregnene-3,20-dione, 3-dimethylmercaptole (I) as starting material, yields 11β,17α-dihydroxy-9α-fluoro-6α-methyl-1,4-pregnadiene-3,20-dione (A).

EXAMPLE 6

In this example certain of the new compounds of this invention are prepared by a novel process therefor which is illustratively represented by the following reaction sequence:

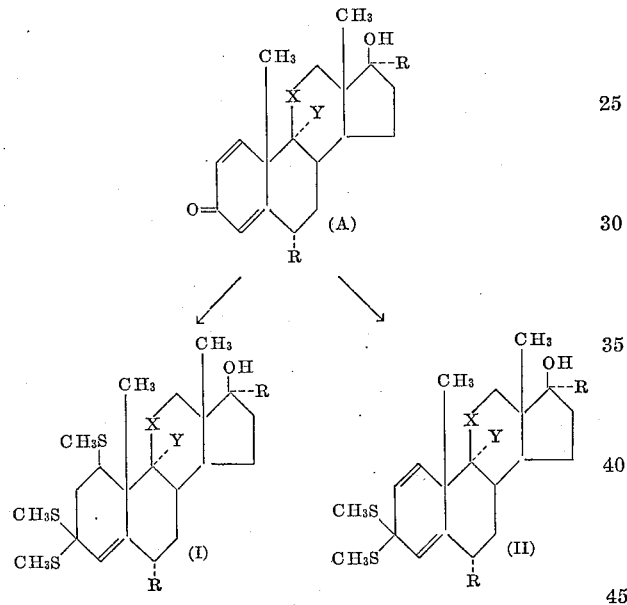

wherein R, X and Y have the same meanings as those indicated therefor following the flow-sheet in column 1.

Following the procedures of Examples 1A, 1C, 2A, 2C, 2D, 2E and 2F but substituting for the starting materials disclosed therein the following:

(1) 17β-hydroxy-17α-methyl - 1,4 - androstadien-3-one (A) (prepared as in British Patent 811,867), (2) 11β,17β-dihydroxy - 17α - methyl - 1,4 - androstadien-3-one (A) (prepared as in U.S. Patent 2,864,832), (3) 11β,17β-dihydroxy-9α-fluoro - 17α - methyl-1,4-androstadien-3- one (A) (prepared as in U.S. Patent 2,793,218), (4) 6α,17α-dimethyl - 17β - hydroxy-1,4-androstadien-3-one (A) (prepared as in British Patent 852,847), (5) 11β,17β-dihydroxy - 6α,17α - dimethyl-1,4-androstadien-3-one (A), (6) 11β,17β-dihydroxy - 6α,17α - dimethyl-9α-fluoro-1,4-androstadien-3-one (A) (prepared as in British Patent 852,847) and (7) 17β-hydroxy-17α-methyl - 1,4,9(11) - androstatrien-3-one (A) (prepared as in U.S. Patent 2,793,218), yields, respectively, (1a) 17β-hydroxy - 17α - methyl - 1β - methylthio-4-androsten-3-one,3-dimethylmercaptole (I), (2a) 11β,17β-dihydroxy - 17β - methyl-1β-methylthio-4-androsten-3-one,3-dimethylmercaptole (I), (3a) 11β,17β-dihydroxy - 9α - fluoro-17α-methyl-1β-methylthio-4-androsten-3-one,3-dimethylmercaptole (I), (4a) 6α,17α dimethyl - 17β - hydroxy-1β-methylthio-4-androsten-3-one,3-dimethylmercaptole (I), (5a) 11β,17α-dihydroxy - 6α,17α - dimethyl-1β-methylthio-4-androsten-3-one,3-dimethylmercaptole (I), (6a) 11β,17β-dihydroxy - 6α,17a - dimethyl-9α-fluoro-1β-methylthio - 4 - androsten-3-one,3-dimethylmercaptole (I), and (7a) 17β-hydroxy - 17α - methyl-1β-methylthio-4,9-(11)-androstadien-3-one,3-dimethylmercaptole (I);

(1b) 17β-hydroxy - 17β - methyl-1,4-androstadien-3-one,3-dimethylmercaptole (II), (2b) 11β,17β-dihydroxy - 17α - methyl-1,4-androstadien-3-one,3-dimethylmercaptole (II), (3b) 11β,17β-dihydroxy - 9α - fluoro-17α-methyl-1,4-androstadien-3-one,3-dimethylmercaptole (II), (4b) 6α,17α-dimethyl - 17β - hydroxy - 1,4 - androstadien-3-one,3-dimethylmercaptole (II), (5b) 11β,17β-dihyroxy - 6α,17α - dimethyl-1,4-androstadien-3-one,3-dimethylmercaptole (II), (6b) 11β,17β-dihydroxy - 6α,17α - dimethyl-9β-fluoro-1,4-androstadien-3-one,3-dimethylmercaptole (II), and (7b) 17β-hydroxy - 17α - methyl - 1,4,9(11) - androstatrien-3-one,3-dimethylmercaptole (II).

EXAMPLE 7

In this example certain of the new compounds of this invention are prepared by a novel process therefor which is illustratively represented by the following reaction sequence:

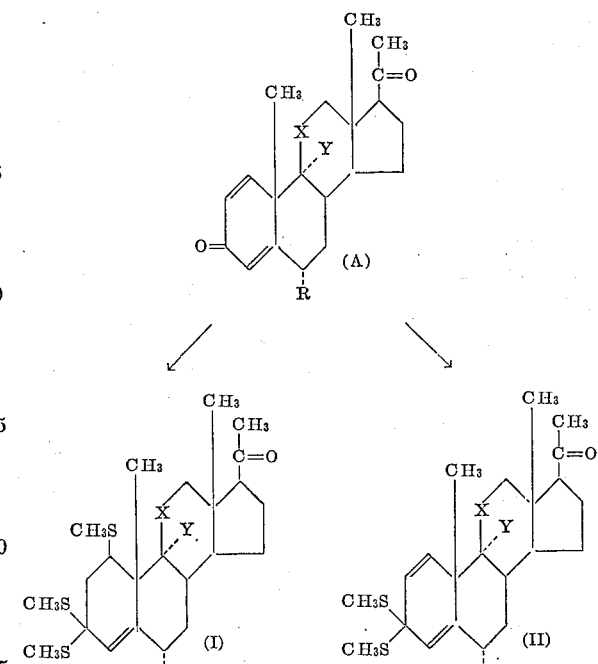

wherein R, X and Y have the same meanings as those indicated therefor following the flow-sheet in column 1.

Following the procedures of Examples 1A, 1C, 2A, 2C, 2D, 2E and 2F but substituting for the starting materials disclosed therein the following:

(8) 1,4-pregnadiene-3,20-dione (A) (prepared as in German Patent 1,021,845), (9) 11β-hydroxy-1,4-pregnadiene-3,20-dione (A),

(10) 9α-fluoro-11β-hydroxy - 1,4 - pregnadiene - 3,20-dione (A),

(11) 6α-methyl-1,4-pregnadiene-3,20-dione (A) (prepared as in British Patent 852,847),

(12) 11β-hydroxy-6α-methyl-1,4 - pregnadiene - 3,20-dione (A) (prepared as in U.S. Patent 2,968,655),

(13) 9α-fluoro-11β-hydroxy-6α-methyl - 1,4 - pregnadiene-3,20-dione (A) (prepared as in U.S. Patent 2,968,655),

(14) 6α-methyl-1,4-pregnadiene-3,11,20 - trione (A) (prepared as in British Patent 852,847), and

(15) 9α-fluoro-6α-methyl - 1,4 - pregnadiene - 3,11,20-trione (A), yields, respectively, (8a) 1β-methylthio-4-pregnene-3,20 - dione,3 - dimethylmercaptole (I), (9a) 11β-hydroxy-1β-methylthio - 4 - pregnene - 3,20-dione,3-dimethylmercaptole (I), (10a) 9α-fluoro-11β-hydroxy-1β - methylthio - 4 - pregnene-3,20-dione,3-dimethylmercaptole (I), (11a) 6α-methyl-1β-methylthio - 4 - pregnene - 3,20-dione,3-dimethylmercaptole (I), (12a) 11β-hydroxy-6α-methyl-1β-methylthio - 4 - pregnene-3,20-dione,3-dimethylmercaptole (I), (13a) 9α-fluoro-11β-hydroxy-6α-methyl - 1β - methylthio-4-pregnene-3,20-dione,3-dimethylmercaptole (I), (14a) 6α-methyl-1β-methylthio-4 - pregnene - 3,11,20-trione,3-dimethylmercaptole (I), and (15a) 9α-fluoro-6α-methyl-1β-methylthio - 4 - pregnene-3,11,20-trione,3-dimethylmercaptole (I);

(8b) 1,4-pregnadiene-3,20 - dione,3 - dimethylmercaptole (II), (9b) 11β-hydroxy-1,4-pregnadiene - 3,20 - dione,3 - dimethylmercaptole (II), (10b) 9α-fluoro-11β-hydroxy-1,4 - pregnadiene - 3,20-dione,3-dimethylmercaptole (II), (11b) 6α-methyl-1,4-pregnadiene - 3,20 - dione,3 - dimethylmercaptole (II), (12b) 11β-hydroxy-6α-methyl-1,4 - pregnadiene - 3,20-dione,3-dimethylmercaptole (II), (13b) 9α-fluoro-11β-hydroxy-6α-methyl-1,4 - pregnadiene-3,20-dione,3-dimethylmercaptole (II), (14b) 6α-methyl-1,4-pregnadiene - 3,11,20 - trione,3-dimethylmercaptole (II) and (15b) 9α-fluoro-6α-methyl-1,4 - pregnadiene - 3,11,20-trione,3-dimethylmercaptole (II).

EXAMPLE 8

In this example certain of the new compounds of this invention are prepared by a novel process therefor, which is illustratively represented by the following reaction sequence:

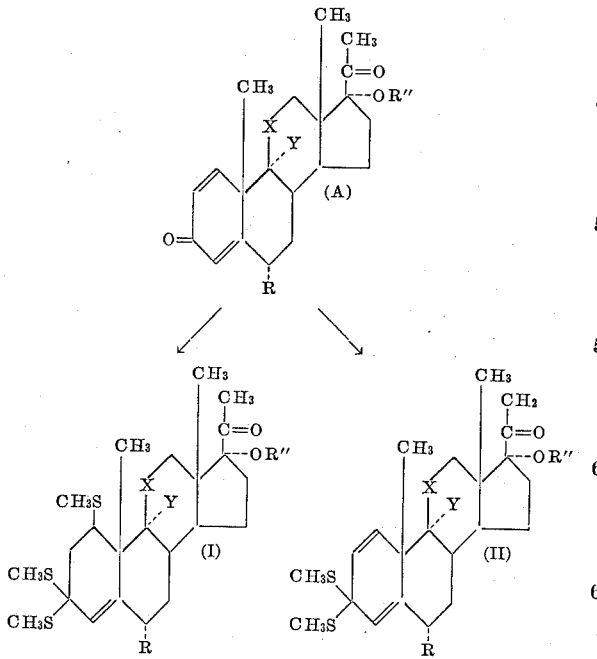

wherein R, R″, X and Y have the same meanings as those indicated therefor following the flow-sheet in column 1.

Following the procedures of Examples 1A, 1C, 2A, 2C, 2D, 2E and 2F but substituting for the starting materials disclosed therein the following:

(16) 17α-hydroxy (or acyloxy)-1,4-pregnadiene-3,20-dione (A) (prepared as in British Patent 854,343),

(17) 9α-fluoro-11β-hydroxy-17α-hydroxy (or acyloxy)-1,4-pregnadiene-3,20-dione (A) (prepared as in British Patent 811,867),

(18) 9α-fluoro-17α-hydroxy (or acyloxy)-1,4-pregnadiene-3,11,20-trione (A),

(19) 17α-hydroxy(or acyloxy)-6α-methyl - 1,4 - pregnadiene-3,20-dione (A) (prepared as in British Patent 852,847).

(20) 17α-hydroxy(or acyloxy)-11β-hydroxy-6α - methyl-1,4-pregnadiene-3,20-dione (A) (prepared as in U.S. Patent 2,867,632) and

(21) 9α-fluoro-11β-hydroxy-17α-hydroxy(or acyloxy)-6α-methyl-1,4-pregnadiene-3,20-dione (A) (prepared as in U.S. Patent 2,867,637), yields, respectively, (16a) 17α-hydroxy(or acyloxy) - 1β - methylthio - 4-pregnene-3,20-dione,3-dimethylmercaptole (I), (17a) 9α-fluoro-11β-hydroxy - 17α - hydroxy(or acyloxy)-1β-methylthio-4-pregnene-3,20 - dione,3 - dimethylmercaptole (I), (18a) 9α-fluoro-17α-hydroxy(or acyloxy)-1β - methylthio-4-pregnene - 3,11,20 - trione,3 - dimethylmercaptole (I), (19a) 17α-hydroxy(or acyloxy)-6α-methyl - 1β - methylthio-4-pregnene-3,20-dione,3-dimethylmercaptole (I), (20a) 17α-hydroxy(or acyloxy) - 11β - hydroxy - 6α-methyl-1β-methylthio-4-pregnene - 3,20,3 - dimethylmercaptole (I), and (21a) 9α-fluoro-11β-hydroxy - 17α - hydroxy(or acyloxy)-6α-methyl-1β-methylthio-4-pregnene - 3,20 - dione,3-dimethylmercaptole (I);

(16b) 17α-hydroxy(or acyloxy)-1,4-pregnadiene-3,20-dione,3-dimethylmercaptole (II), (17b) 9α-fluoro-11β-hydroxy-17α-hydroxy(or acyloxy) 1,4-pregnadiene-3,20-dione,3-dimethylmercaptole (II), (18b) 9α-fluoro-17α-hydroxy(or acyloxy)-1,4-pregnadiene-3,11,20-trione,3-dimethylmercaptole (II), (19b) 17α-hydroxy(or acyloxy)-6α-methyl-1,4-pregnadiene-3,20-dione,3-dimethylmercaptole (II), (20b) 17α-hydroxy(or acyloxy)-11β-hydroxy-6α-methyl-1,4-pregnadiene-3,20-dione,3-dimethylmercaptole (II), and (21b) 9α-fluoro-11β-hydroxy-17α-hydroxy(or acyloxy) 6α-methyl-1,4-pregnadiene-3,20-dione,3 - dimethylmercaptole (II).

EXAMPLE 9

In this example certain of the new compounds of this invention are prepared by a novel process therefor, which is illustratively represented by the following reaction sequence:

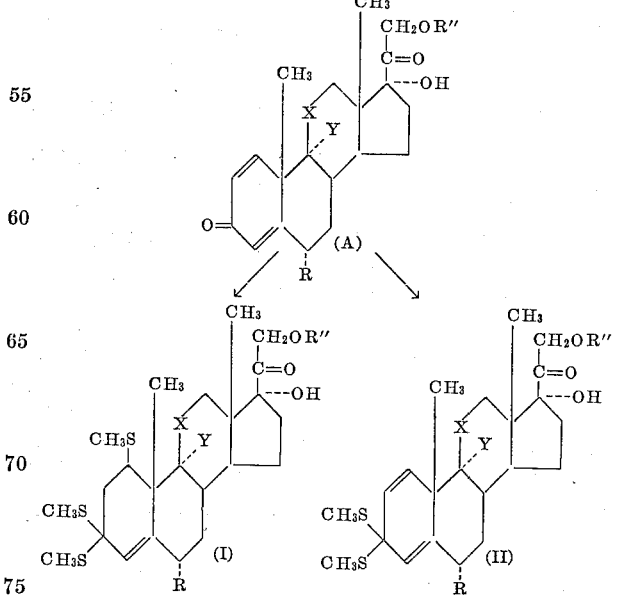

wherein R, R", X and Y have the same meanings as those indicated therefor following the flow-sheet in column 1.

Following the procedures of Examples 1A, 1C, 2A, 2C, 2D, 2E and 2F, but substituting for the starting materials disclosed therein in the following:

(22) 17α-hydroxy-21-hydroxy(or acyloxy)-1,4-pregnadiene-3,20-dione (A) (prepared as in German Patent 1,021,845),

(23) 11β,17α-dihydroxy-21-hydroxy(or acyloxy)-1,4-pregnadiene-3,20-dione (A) [prepared as in Science 121, 176 (1955)],

(24) 9α-fluoro-11β,17α-dihydroxy-21-hydroxy(or acyloxy)-1,4-pregnadiene-3,20-dione (A) [prepared as in J. Amer. Chem. Soc. 77, 4181 (1955), and British Patent 811,867],

(25) 17α-hydroxy-21-hydroxy(or acyloxy)-1,4-pregnadiene-3,11,20-trione (A) [prepared as in Science 121, 176 (1955)],

(26) 9α-fluoro-17α-hydroxy-21-hydroxy(or acyloxy) 1,4-pregnadiene-3,11,20-trione (A) [prepared as in J. Amer. Chem. Soc. 77, 4181 (1955), and British Patent 811,867],

(27) 17α-hydroxy-21-hydroxy(or acyloxy)-6α-methyl-1,4-pregnadiene-3,20-dione (A),

(28) 11β,17α-dihydroxy-21-hydroxy(or acyloxy) - 6α-methyl-1,4-pregnadiene-3,20-dione (A) (prepared as in Example 1 of U.S. Patent 2,897,218),

(29) 9α-fluoro-11β,17α-dihydroxy-21-hydroxy(or acyloxy)-6α-methyl-1,4-pregnadiene - 3,20 - dione (A) [prepared as in J. Amer. Chem. Soc. 79, 1515 (1957)], yields, respectively, (22a) 17α-hydroxy-21-hydroxy(or acyloxy)-1β - methylthio-4-pregnene-3,20-dione,3-dimethylmercaptole (I), (23a) 11β,17α-dihydroxy-21-hydroxy(or acyloxy)-1β-methylthio-4-pregnene-3,20-dione,3 - dimethylmercaptole (I), (24a) 9α-fluoro-11β,17α-dihydroxy-21-hydroxy(or acyloxy)-1β-methylthio-4-pregnene-3,20-dione,3 - dimethylmercaptole (I), (25a) 17α-hydroxy-21-hydroxy(or acyloxy)-1β-methylthio-4-pregnene-3,11,20 - trione,3 - dimethylmercaptole (I), (26a) 9α-fluoro-17α-hydroxy-21-hydroxy(or acyloxy) 1β-methylthio-4-pregnene-3,11,20-trione,3 - dimethylmercaptole (I), (27a) 17α-hydroxy-21-hydroxy(or acyloxy)-6α-methyl-1β-methylthio-4-pregnene-3,20-dione,3 - dimethylmercaptole (I), (28a) 11β,17α-dihydroxy-21-hydroxy(or acyloxy)-6α-methyl-1β-methylthio-4-pregnene-3,20-dione,3 - dimethylmercaptole (I), and (29a) 11β,17α-dihydroxy-9α-fluoro-21-hydroxy(or acyloxy)-6α-methyl-1β-methylthio-4-pregnene - 3,20-dione,3-dimethylmercaptole (I);

(22b) 17α-hydroxy-21-hydroxy(or acyloxy)-1,4-pregnadiene-3,20-dione,3-dimethylmercaptole (II), (23b) 11β,17α-dihydroxy-21-hydroxy(or acyloxy)-1,4-pregnadiene-3,20-dione,3-dimethylmercaptole (II), (24b) 11β,17α-dihydroxy-9α-fluoro-21-hydroxy(or acyloxy)-1,4-pregnadiene-3,20-dione,3 - dimethylmercaptole (II), (25b) 17α-hydroxy-21-hydroxy(or acyloxy)-1,4-pregnadiene-3,11,20-trione,3-dimethylmercaptole (II), (26b) 9α-fluoro-17α-hydroxy-21-hydroxy(or acyloxy) 1,4-pregnadiene-3,11,20-trione,3-dimethylmercaptole (II), (27b) 17α-hydroxy-21-hydroxy(or acyloxy) - 6α-methyl-1,4-pregnadiene-3,20-dione,3-dimethylmercaptole (II), (28b) 11β,17α-dihydroxy-21-hydroxy(or acyloxy)-6α-methyl-1,4-pregnadiene-3,20-dione,3 - dimethylmercaptole (II) and (29b) 11β,17α-dihydroxy-9α-fluoro-21-hydroxy(or acyloxy)-6α-methyl-1,4-pregnadiene-3,20-dione,3-dimethylmercaptole (II).

I claim:
1. Compounds of the formula

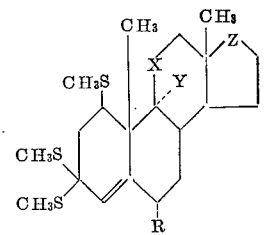

wherein R is selected from the group consisting of hydrogen and methyl; Y is selected from the group consisting of hydrogen and fluorine; when Y is hydrogen, X is selected from the group consisting of the methylene radical ($>CH_2$), the β-hydroxymethylene radical

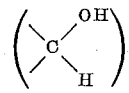

and the carbonyl radical ($>C=O$); when Y is fluorine, X is selected from the group consisting of the β-hydroxymethylene radical and the carbonyl radical; X and Y together is a double bond at the 9(11)-position; Z is selected from the group consisting of

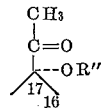

and

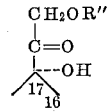

wherein R" is selected from the group consisting of hydrogen and the lower-acyl radical of a hydrocarbon carboxylic acid containing from one to eight carbon atoms, inclusive.

2. A compound selected from the group consisting of 17α-hydroxy-6α-methyl-1β-methylthio-4-pregnene - 3,20-dione, 3-dimethylmercaptole and the 17-acylates thereof wherein the acyl radical is that of a hydrocarbon carboxylic acid containing from one to eight carbon atoms, inclusive.

3. A compound selected from the group consisting of 9α-fluoro-11β,17α-dihydroxy-1β-methylthio-4 - pregnene-3,20 - dione,3 - dimethylmercaptole and the 17 - acylates thereof wherein the acyl radical is that of a hydrocarbon carboxylic acid containing from one to eight carbon atoms, inclusive.

4. A compound selected from the group consisting of 9α-fluoro-11β,17α-dihydroxy-6α-methyl-1β - methylthio-4-pregnene-3,20-dione,3-dimethylmercaptole and the 17-acylates thereof wherein the acyl radical is that of a hydrocarbon carboxylic acid containing from one to eight carbon atoms, inclusive.

5. 9α-fluoro-11β,17α-dihydroxy-6α-methyl-1β - methylthio-4-pregnane - 3,20 - dione,3 - dimethylmercaptole 17-acetate.

6. A compound selected from the group consisting of 9α-fluoro-11β,17α,21-trihydroxy-1β-methylthio - 4 - pregnene-3,20-dione,3-dimethylmercaptole and the 21-acylates thereof wherein the acyl radical is that of a hydrocarbon carboxylic acid containing from one to eight carbon atoms, inclusive.

7. 9α-fluoro-11β,17α,21-trihydroxy-1β - methylthio- 4- 3,20-dione,3-dimethylmercaptole 21-actate.

8. A compound selected from the group consisting of 11β,17α,21-trihydroxy-1β-methylthio - 4 pregnene - 3,20-dione, 3-dimethylmercaptole and the 21-acylates thereof wherein the acyl radical is that of a hydrocarbon carboxylic acid containing from one to eight carbon atoms, inclusive.

9. 11β,17α,21-trihydroxy-1β-methylthio-4 - pregnene-3,20-dione, 3-dimethylmercaptole 21-actate.

10. A compound selected from the group consisting of 11β,17α,21-trihydroxy-6α-methyl-1β-methylthio - 4 - pregnene-3,20-dione,3-dimethylmercaptole and the 21-acylates thereof wherein the acyl radical is that of a hydrocarbon carboxylic acid containing from one to eight carbon atoms, inclusive.

11. 11β,17α,21-trihydroxy-9α-fluoro - 6α - methyl - 1β-methylthio-4-pregnene-3,20-dione,3 - dimethylmercaptole 21-acetate.

12. Compounds of the formula

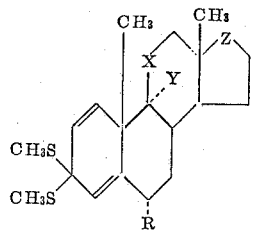

wherein R is selected from the group consisting of hydrogen and methyl; Y is selected from the group consisting of hydrogen and fluorine; when Y is hydrogen, X is selected from the group consisting of the methylene radical (>CH₂), the β-hydroxymethylene radical

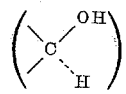

and the carbonyl radical (>C=O); when Y is fluorine, X is selected from the group consisting of the β-hydroxymethylene radical and the carbonyl radical; X and Y together is a double bond at the 9(11)-position; Z is selected from the group consisting of

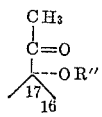

and

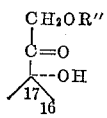

wherein R'' is selected from the group consisting of hydrogen and the lower-acyl radical of a hydrocarbon carboxylic acid containing from one to eight carbon atoms, inclusive.

13. A compound seected from the group consisting of 17α-hydroxy-6α-methyl-1,4-pregnadiene-3,20-dione 3 - dimethylmercaptole and the 17-acylates thereof wherein the acyl radical is that of a hydrocarbon carboxylic acid containing from one to eight carbon atoms, inclusive.

14. A compound selected from the group consisting of 9α-fluoro-11β,17α-dihydroxy - 6α - methyl - 1,4 - pregnadiene-3,20-dione, 3-dimethylmercaptole and the 17-acylates thereof wherein the acyl radical is that of a hydrocarbon carboxylic acid containing from one to eight carbon atoms, inclusive.

15. A compound selected from the group consisting of 11β,17α,21-trihydroxy-1,4-pregnadiene-3,20-dione, 3 - dimethylmercaptole and the 21acylates thereof wherein the acyl radical is that of a hydrocarbon carboxylic acid containing from one to eight carbon atoms, inclusive.

16. A compound selected from the group consisting of 11β,17α,21-trihydroxy-6α methyl-1,4-pregnadiene - 3,20-dione, 3-dimethylmercaptole and the 21-actylates thereof wherein the acyl radical is that of a hydrocarbon carboxylic acid containing from one to eight carbon atoms, inclusive.

17. 11β,17α-dihydroxy-9α - fluoro - 1,4 - pregnadiene-3,20-dione, 3-dimethylmercaptole.

18. A compound selected from the group consisting of 11β,17α,21-trihydroxy-9α-fluoro-1,4 - pregnadiene - 3,20-dione, 3-dimethylmercaptole 21-acetate and the corresponding 11-keto counterpart thereof.

19. A process for the production of a compound of the Formula I

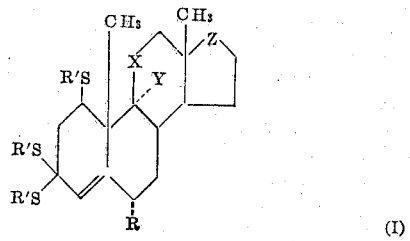

where R is selected from the group consisting of hydrogen and methyl; R' is a lower-alkyl radical containing from one to eight carbon atoms, inclusive; Y is selected from the group consisting of hydrogen and fluorine; when Y is hydrogen, X is selected from the group consisting of the methylene radical (>CH₂), the β-hydroxymethylene radical

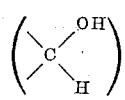

and the carbonyl radical (>C=O); when Y is fluorine, X is selected from the group consisting of the β-hydroxymethylene radical and the carbonyl radical; X and Y together is a double bond at the 9(11)-position; Z is selected from the group consisting of

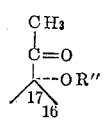

and

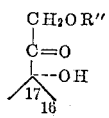

wherein R'' is selected from the group consisting of hydrogen and the lower-acyl radical of an organic carboxylic acid containing from one to eight carbon atoms, inclusive, which comprises treating a corresponding compound of the Formula A

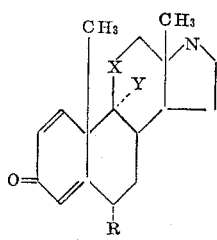

wherein R, X, Y and Z have the same meanings as above, in a solvent selected from the group consisting of tetrahydrofuran and t-butyl alcohol with an alkanethiol in the presence of an acid catalyst.

20. A process for the production of a compound of the Formula II

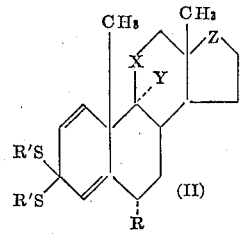

wherein R is selected from the group consisting of hydrogen and methyl; R' is a lower-alkyl radical containing from one to eight carbon atoms, inclusive; Y is selected from the group consisting of hydrogen and fluorine; when Y is hydrogen, X is selected from the group consisting of the methylene radical ($>CH_2$), the β-hydroxymethylene radical

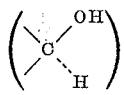

and the carbonyl radical ($>C=O$); when Y is fluorine, X is selected from the group consisting of the β-hydroxymethylene radical and the carbonyl radical; X and Y together is a double bond at the 9(11)-position; Z is selected from the group consisting of

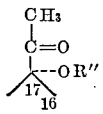

and

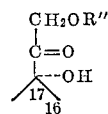

wherein R" is selected from the group consisting of hydrogen and the lower-acyl radical of an organic carboxylic acid containing from one to eight carbon atoms, inclusive, which comprises treating a corresponding compound of the Formula A

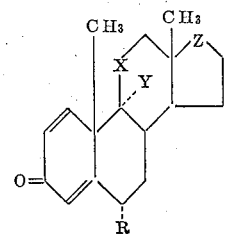

wherein R, X, Y and Z have the same meanings as above, in a dialkylformamide with an alkanethiol in the presence of an acid catalyst.

No references cited.

LEWIS GOTTS, *Primary Examiner*.

UNITED STATES PATENT OFFICE
CERTIFICATE OF CORRECTION

Patent No. 3,261,854                          July 19, 1966

Donald E. Ayer

It is hereby certified that error appears in the above numbered patent requiring correction and that the said Letters Patent should read as corrected below.

Column 3, line 13, after "stand" insert -- from --; column 7, line 41, for "produce" read -- product --; column 12, line 8, for "17β-hydroxy-17β-" read -- 17β-hydroxy-17α- --; line 18, for "-9β-" read -- -9α- --; column 13, lines 56 to 68, for that portion of the formula reading "$CH_2$" read -- $CH_3$ --; column 14, line 26, for "-3,20,3-" read -- -3,20-dione, 3- --; column 16, lines 19 to 21, and column 18, lines 31 to 34, the radicals, each occurrence, should appear as shown below instead of as in the patent:

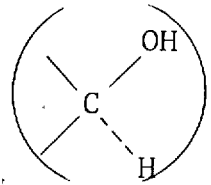

same column 16, line 71, after "-4-" insert -- pregnene- --; same column 16, line 72 and column 17, line 5, for "-actate", each occurrence, read -- -acetate --; column 17, line 56, for "seected" read -- selected --; column 18, lines 61 to 70, the upper right-hand portion of the formula reading

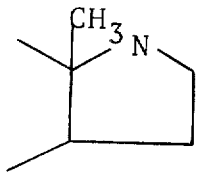            read            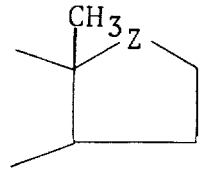

Signed and sealed this 1st day of August 1967.

(SEAL)
Attest:

EDWARD M. FLETCHER, JR.
Attesting Officer

EDWARD J. BRENNER
                                           Commissioner of Patents